T. J. COO.
TYPE WRITING MACHINE.
APPLICATION FILED NOV. 6, 1907.
973,628.
Patented Oct. 25, 1910.
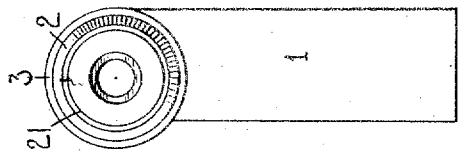
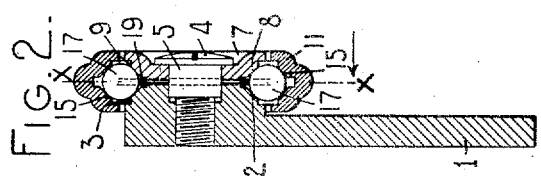
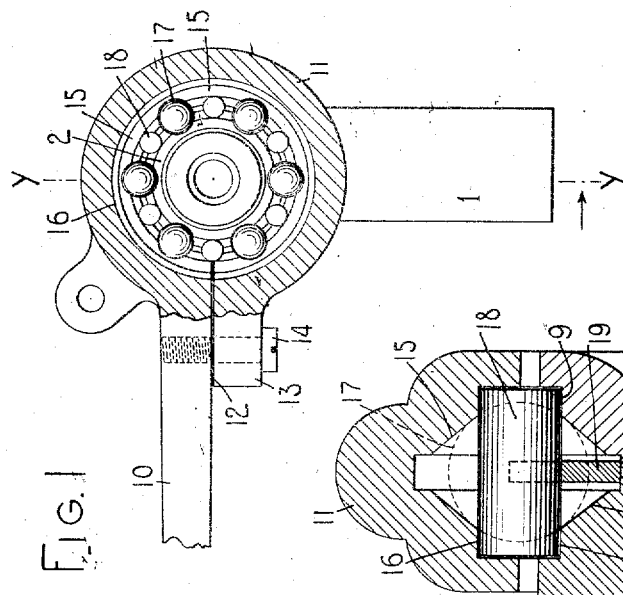
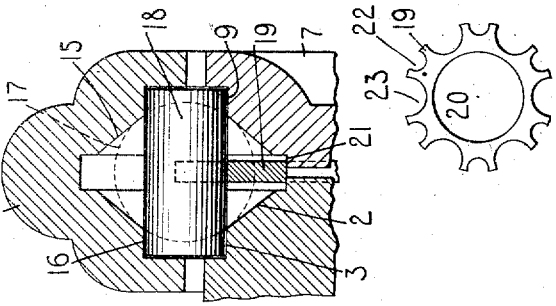
WITNESSES.
J. B. Reeves
Charles E. Smith
INVENTOR:
Thomas J. Coo
By Jacob Felbel
HIS ATTORNEY

UNITED STATES PATENT OFFICE.

THOMAS J. COO, OF TORONTO, ONTARIO, CANADA, ASSIGNOR TO THE MONARCH TYPE-WRITER COMPANY, OF SYRACUSE, NEW YORK, A CORPORATION OF NEW YORK.

TYPE-WRITING MACHINE.

973,628.

Specification of Letters Patent.   Patented Oct. 25, 1910.

Application filed November 6, 1907. Serial No. 400,945.

*To all whom it may concern:*

Be it known that I, THOMAS J. COO, subject of the King of England, and resident of Toronto, Province of Ontario, in the county of York and Dominion of Canada, have invented certain new and useful Improvements in Type-Writing Machines, of which the following is a specification.

My invention relates to typewriting machines and more particularly to anti-friction means for supporting the type bars in place and the object of said invention is to provide simple and efficient means of the character specified.

To the above and other ends which will hereinafter appear, my invention consists in the features of construction, arrangements of parts and combinations of devices to be fully set forth hereinafter and particularly pointed out in the appended claims.

In the drawings, Figure 1 is an enlarged detail fragmentary sectional view of the pivotal end of a type bar and its hanger taken on the line $x$—$x$ of Fig. 2 and looking in the direction of the arrow at said line. Fig. 2 is an enlarged transverse sectional view of the same taken on the line $y$—$y$ of Fig. 1 and looking in the direction of the arrow at said line. Fig. 3 is a detail side view of the hanger. Fig. 4 is an enlarged detail fragmentary transverse sectional view showing a portion of the bearing. Fig. 5 is a detail side view of the spacer for the anti-friction balls and rollers. Fig. 6 is a side view of the adjustable cone piece. Fig. 7 is a transverse sectional view of the same. Fig. 8 is a detail perspective view of one of the bearing rollers.

The hanger or support comprises a stem or securing portion 1 from one side of which projects a bearing piece having a cone bearing 2 and a cylindrical bearing 3. The bearing piece is apertured centrally for the reception of a headed screw 4, the enlarged portion 5 of which passes through a central aperture 6 in a companion bearing piece 7 having a cone bearing 8 corresponding to the bearing 2 and a cylindrical bearing 9 corresponding to the bearing 3. The construction is such that an adjustment of the screw 4 effects an adjustment of the bearing piece 7 toward and away from the projecting bearing on the hanger axially of the type bar. The type bar 10 has a bearing eye 11 split as indicated at 12 and formed with an extension 13 apertured to receive a screw 14 which takes at its threaded end in a tapped opening in the body of the type bar in order to effect an expansion and contraction of the eye of the type bar so as to provide for an adjustment of the bearing in the eye of the type bar toward and away from the pivotal axis of the bar. The eye of the type bar is provided with oppositely disposed cone bearings 15 and with cylindrical bearing walls 16. Circularly arranged anti-friction balls 17 and non-spherical or cylindrical bearing rollers 18 are arranged between the bearings on the hanger or support and the eye of the type bar, the axis of the cylindrical rollers being parallel with the axis of revolution of the type bar. These anti-friction balls and cylindrical rollers alternate as indicated in Fig. 1, the balls coöperating with the cone bearings 15, 2 and 8 of the type bar and hanger and the cylindrical anti-friction rollers coöperating with the bearings 3, 9 and 16 of the hanger and type bar. The bearings are preferably arranged as indicated in Fig. 1 so that the anti-friction balls contact with their bearings at essentially the same distance from the pivotal center of the type bar as the cylindrical rollers do with their bearings. The relation of the parts is such that the type bar is supported primarily for turning movement on its bearings by the cylindrical anti-friction rollers 18 but the length of these rollers is such that they do not receive a bearing contact at their ends and do not therefore take the lateral or axial thrust of the type bar on its support, this axial thrust of the type bar being taken by the anti-friction balls 17.

It will be understood that the screw 14 is provided to effect a relative adjustment of the bearings of the cylindrical feed rollers in one direction or radially, whereas the screw 4 is provided in order to effect a relative adjustment between the cone bearings on the hanger in order to effect an adjustment of the bearings for the anti-friction balls in another direction or axially of the type bar.

I prefer to employ a spacer 19 having a central aperture 20 therein to turn on bearings 21 formed on the projecting bearing piece of the type bar hanger and on the adjustable bearing piece 7. This spacer is apertured at 22 for coöperation with the anti-friction rollers 18 and is apertured at 23 for coöperation with the anti-friction balls 17. By this arrangement the balls and rollers may be maintained properly spaced apart in their bearings. From an inspection of Fig. 2 it will be seen that the spacer is situated between the companion adjustable cone pieces on the type bar hanger and is contained within the eye of the type bar and is prevented from axial movement by the cone bearings at the sides of the spacer, thus being maintained centered in the median plane of the type bar. The balls and rollers are preferably arranged as shown so as to be cut by the median plane of the type bar and thus avoid any cranking action.

What I claim as new and desire to secure by Letters Patent, is:—

1. The combination of a type bar, a support therefor, a single set of anti-friction balls and a single set of anti-friction rollers of a different shape between said type bar and said support, the said sets of balls and rollers together sustaining the weight of the type bar and the said single set of balls alone receiving the axial thrust of the bar in both directions.

2. The combination of a type bar, a support therefor, alternating circularly arranged anti-friction balls and rollers of a different shape between said type bar and its support, the axes of the rollers being parallel with the axis of revolution of the type bar, and independent means for effecting a relative adjustment between the bearings for said balls and rollers.

3. The combination of a type bar, a support therefor, alternating circularly arranged anti-friction balls and rollers of a different shape between said type bar and its support, the axes of the rollers being parallel with the axis of revolution of the type bar, means for effecting a relative adjustment for the rollers in one direction, and independent means for effecting a relative adjustment between the bearings for the balls in another direction.

4. The combination of a type bar, a support therefor and anti-friction balls and rollers of a different shape between said type bar and its support, the rollers supporting the type bar for turning movement on its axis of rotation without taking the axial thrust of the bar and the balls taking the axial thrust of the bar, the median plane of the type bar passing through said balls and rollers.

5. The combination of a type bar, a support therefor, anti-friction balls and loosely disposed rollers of a different shape between said type bar and support, the bearing for the rollers on both the type bar and support being parallel to the axis of revolution of the type bar and the bearings on both the type bar and its support for the balls being inclined to the axis of revolution of the type bar.

6. The combination of a hanger, a type bar having an eye, and anti-friction balls and loosely disposed rollers of a different shape between the eye of the type bar and the hanger, the eye of the type bar and the hanger having cylindrical bearings for the rollers and cone bearings for the balls.

7. The combination of a hanger, a type bar having an eye, anti-friction balls and rollers of another shape between the eye of the type bar and the hanger, the eye of the type bar and the hanger having cylindrical bearings for the rollers and cone bearings for the balls, means for effecting a relative adjustment between certain of said cone bearings in parallel planes, and independent means for effecting a relative radial adjustment between said cylindrical bearings.

8. A type bar having a split eye, a hanger having cones received within said eye, alternating circularly arranged anti-friction balls and rollers of a different shape between said type bar and eye, cylindrical bearings on the type bar and hanger for said rollers, means for effecting an expansion and contraction of the split eye to adjust the relation between said cylindrical bearings, cone bearings on said type bar and hanger for said balls, and independent means for effecting a relative adjustment of certain of said cone bearings axially of the type bar.

9. A type bar having an eye, a hanger having relatively adjustable cone pieces contained within said eye, circularly arranged anti-friction balls and rollers of a different shape between said eye and cone pieces, and a spacer contained within said eye between said cone pieces and coöperative with the balls and rollers to maintain them spaced apart.

10. The combination of a type bar having a split eye, a hanger, anti-friction devices between bearings in the hanger and said eye, means for expanding and contracting said eye, and independent means for adjusting the bearings on the hanger.

11. The combination of a type bar having an eye with cylindrical and cone bearings therein, a hanger having cone and cylindrical bearings at one side thereof, said bearings on the hanger being received within the eye of the type bar, companion cone and cylindrical bearings adjustably secured to the hanger and contained within the eye on the type bar, anti-friction balls coöperating with the cone bearings, and anti-friction rollers coöperative with the cylindrical bearings.

12. The combination of a type bar having a split eye with cylindrical and cone bearings therein, a hanger having cone and cylindrical bearings at one side thereof, said bearings on the hanger being received within the eye of the type bar, companion cone and cylindrical bearings adjustably secured to the hanger and contained within the eye on the type bar, anti-friction balls coöperative with the cone bearings, anti-friction rollers coöperative with the cylindrical bearings, and means for expanding and contracting the eye of the type bar to effect a relative adjustment of the cylindrical bearings for said rollers.

13. The combination of a type bar having an eye with a cylindrical internal bearing surface, a hanger having a cylindrical bearing surface, a single set of cylindrical rollers between said bearing surfaces said rollers being cut by the median plane of the type bar, and means independent of said cylindrical rollers for taking the side thrust of the type bar.

14. The combination of a type bar having an eye, a support for the type bar, cylindrical rollers contained within said eye for supporting the type bar for turning movement on its axis of rotation without taking the axial thrust of the bar, said rollers being shorter than the eye is thick and the median plane of the type bar passing through said rollers, and balls which coöperate with said type bar and its support and which take the axial thrust of the bar.

Signed at Syracuse, in the county of Onondaga, and State of New York, this 2d day of November, A. D. 1907.

THOMAS J. COO.

Witnesses:
 SILAS W. CRANDALL,
 FRANK L. PIERCE.